United States Patent
Koivukunnas et al.

(10) Patent No.: US 8,105,677 B2
(45) Date of Patent: Jan. 31, 2012

(54) ANTI-COUNTERFEIT HOLOGRAM

(75) Inventors: Pekka Koivukunnas, Järvenpää (FI); Harri Kosonen, Lohja (FI)

(73) Assignee: Avantone Oy, Helsinki (FI)

( * ) Notice: Subject to any disclaimer, the term of this patent is extended or adjusted under 35 U.S.C. 154(b) by 470 days.

(21) Appl. No.: 12/303,475

(22) PCT Filed: Jun. 12, 2007

(86) PCT No.: PCT/FI2007/050349
§ 371 (c)(1),
(2), (4) Date: Mar. 18, 2009

(87) PCT Pub. No.: WO2007/144469
PCT Pub. Date: Dec. 21, 2007

(65) Prior Publication Data
US 2009/0237795 A1 Sep. 24, 2009

(30) Foreign Application Priority Data
Jun. 14, 2006 (FI) .................................. 20065407

(51) Int. Cl.
*B32B 3/00* (2006.01)
*B44C 1/24* (2006.01)
*B42D 15/10* (2006.01)
*B28B 11/12* (2006.01)
*B29C 59/00* (2006.01)
*B31F 1/07* (2006.01)

(52) U.S. Cl. ...................... 428/156; 428/182; 428/211.1; 493/53; 493/58; 493/320; 493/395; 283/72; 283/86; 283/106; 264/239; 264/293; 425/193; 425/385; 101/32

(58) Field of Classification Search ................. 428/34.2, 428/156, 182, 211.1; 359/8, 558, 566, 567, 359/570, 575; 430/1, 2; 283/72, 86, 106; 156/209; 264/1.34, 239, 293; 425/328, 193, 425/385; 493/53, 58, 320, 395; 101/22, 101/32
See application file for complete search history.

(56) References Cited

U.S. PATENT DOCUMENTS

| | | |
|---|---|---|
| 4,913,858 A | 4/1990 | Miekka et al. |
| 5,862,750 A | 1/1999 | Dell'Olmo |
| 5,945,042 A | 8/1999 | Mimura et al. |
| 6,174,586 B1 | 1/2001 | Peterson |
| 2003/0173046 A1 | 9/2003 | Jaaskelainen et al. |
| 2004/0207892 A1 | 10/2004 | Menz et al. |
| 2005/0146084 A1 | 7/2005 | Simoneta et al. |

FOREIGN PATENT DOCUMENTS

| | | |
|---|---|---|
| JP | 2004-268552 A1 | 9/2004 |
| WO | 2005/070693 A1 | 8/2005 |
| WO | 2006/037851 A1 | 4/2006 |
| WO | 2006/095049 A1 | 9/2006 |
| WO | 2007/144469 A1 | 12/2007 |

OTHER PUBLICATIONS

Search Report issued in PCT/FI2007/050349.

*Primary Examiner* — Donald J Loney
(74) *Attorney, Agent, or Firm* — Stiennon & Stiennon

(57) ABSTRACT

A microstructure area (201) providing a first diffractive visual effect is produced on the surface layer (240) of a paper or cardboard substrate (230) of a product (200). In addition, a bulge (206) or a recess (207) having a second microstructure area (202) is produced on the surface layer (240), wherein a doubly curved portion (203) is located between the first (201) and the second (202) microstructure areas. Said combination of the bulge (206)/recess (207), microstructure areas (201, 202) and doubly curved portion (203) makes counterfeiting of the product (200) difficult and provides a special visual effect.

14 Claims, 8 Drawing Sheets

ANTI-COUNTERFEIT HOLOGRAM

CROSS REFERENCES TO RELATED APPLICATIONS

This application is a U.S. national stage application of International App. No. PCT/FI2007/050349, filed Jun. 12, 2007, the disclosure of which is incorporated by reference herein, and claims priority on Finnish App. No. 20065407 filed Jun. 14, 2006.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a product with a diffractive microstructure. The present invention also relates to a method for manufacturing a product having diffractive microstructure areas and a device for producing diffractive microstructure areas on the surface layer of a paper or cardboard substrate by embossing.

Diffractive microstructure areas may be attached to products e.g. for producing a visual effect or for authenticating the product.

Diffractive microstructures may be produced e.g. by embossing the surface of a substrate coated with a suitable lacquer. When producing the microstructure, the substrate is pressed between an embossing member and a backing member. The surface of the embossing member comprises a relief corresponding to the microstructure. During the embossing process, the backing member supports the substrate from the back side so that a sufficient pressure may be exerted on the surface of the substrate for shaping the surface layer of the substrate to correspond to the relief of the embossing member.

U.S. Pat. No. 4,913,858 discloses a method for producing a diffractive microstructure on the surface of a paper coated with a thermoplastic material. The microstructure is formed into the coating by using a heated embossing roll.

SUMMARY OF THE INVENTION

It is an object of the present invention to introduce an anti-counterfeit diffractive microstructure with low manufacturing costs, as well as a device and a method for producing said microstructure.

The present invention is primarily characterized in that the product comprises, in addition to a first bare diffractive microstructure area embossed on a paper or cardboard substrate, a bulge or a recess, which bulge or recess comprises a second embossed diffractive microstructure area, wherein a doubly curved portion is located between said first microstructure area and said second microstructure area.

The paper or cardboard substrate of the product has a bulge and/or a recess as well as at least two bare diffractive microstructure areas so that at least one of said microstructure areas is located on said bulge or recess so that a doubly curved portion is located between said microstructure areas.

The diffractive microstructures are used to produce a visual effect in order to authenticate the product. The bare diffractive microstructure combined with the bulge and with the doubly curved surface is inexpensive to manufacture but still relatively difficult to copy, which makes it difficult to counterfeit the product. To some extent, the bulge or recess also protects the microstructure that is on a lower level, from rubbing and dirt. Furthermore, the bare diffractive microstructure connected to the bulge and to the doubly curved surface creates a special visual effect.

The use of a paper or cardboard substrate in combination with a bare microstructure allows low production costs and an advantageous production rate. In particular, the use of cardboard also enables the stability of the substrate required for the bulges and/or for the recesses at relatively low costs. The solution according to the invention is advantageous, for example, in disposable and recyclable products and product packages, because extra metal and/or protective coatings are not necessarily needed for producing the microstructures.

The invention and its fundamental properties as well as the advantages to be attained by means of the invention will become more evident for a person skilled in the art from the claims and from the following description, in which the invention will be described in more detail by means of a few selected examples.

The invention and its fundamental properties as well as the advantages to be attained by means of the invention will become more evident for the person skilled in the art from the following description in which the invention will be described in more detail by means of a few selected examples, referring to the appended drawings.

BRIEF DESCRIPTION OF THE DRAWINGS

FIG. 2b is a schematic and cross-sectional view of a product made by using the embossing member of FIG. 2a.

FIG. 3b is a schematic and three-dimensional view of a product made by using the embossing member of FIG. 3a.

FIG. 4b is a schematic and three-dimensional view of a product made by using the embossing member of FIG. 4a.

FIG. 5b is a schematic and three-dimensional view of a product package made by using the embossing member of FIG. 5a.

FIG. 12b is a schematic and cross-sectional view of producing recesses in the substrate of FIG. 12a.

DESCRIPTION OF THE PREFERRED EMBODIMENTS

Figure 1:
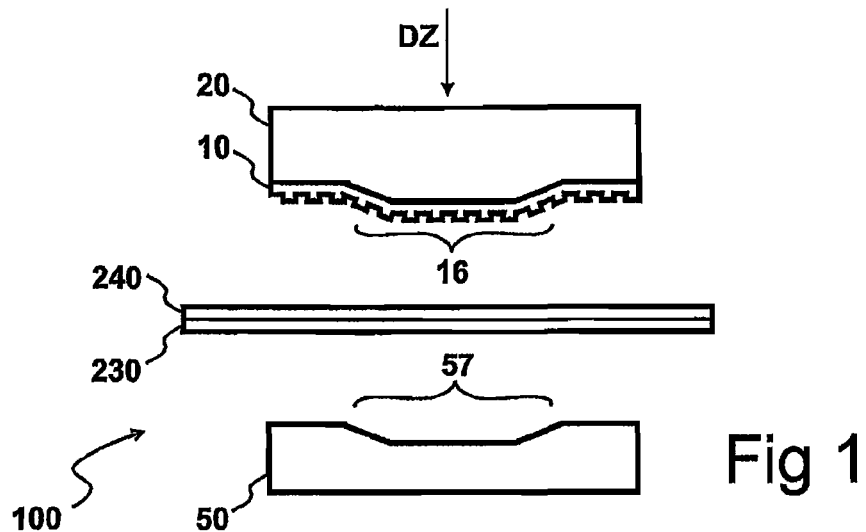
FIG. 1 is a schematic and cross-sectional view of the embossing device and the substrate before embossing.

With reference to FIG. 1, diffractive microstructures may be produced by pressing a substrate 230 and its surface layer 240 between an embossing member 10 and a backing member 50. The embossing member 10 has a microstructure surface. The embossing member 10 and the backing member 50 exert an embossing pressure on the surface layer 240 of the substrate, wherein compression and/or material flow takes place in microscopic scale in the surface layer so that a microstructure corresponding to the embossing member 10 is formed in the surface layer 240.

The embossing member 10 may have a macroscopic bulge 16, and the backing member may have a corresponding macroscopic recess 57. The bulge 16 and the recess 57 shape a macroscopic recess 207 in the substrate 230 and in its surface layer 240 (FIG. 2b).

The embossing member is connected to a backing support 20. During embossing, the embossing member 10 may move in a direction DZ with respect to the backing member 50.

Figure 2A:
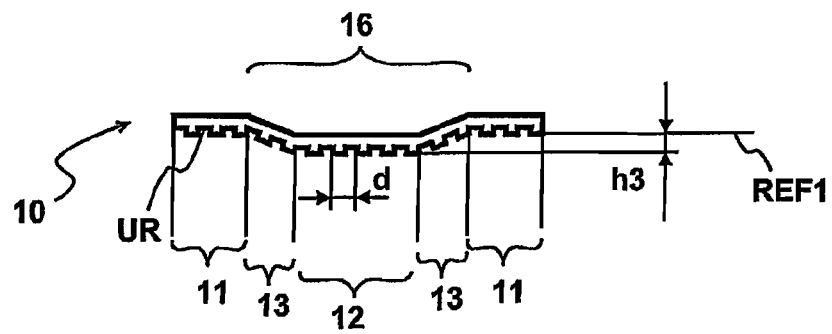
FIG. 2a is a schematic and cross-sectional view of the embossing member having a bulge.
Figure 2B:
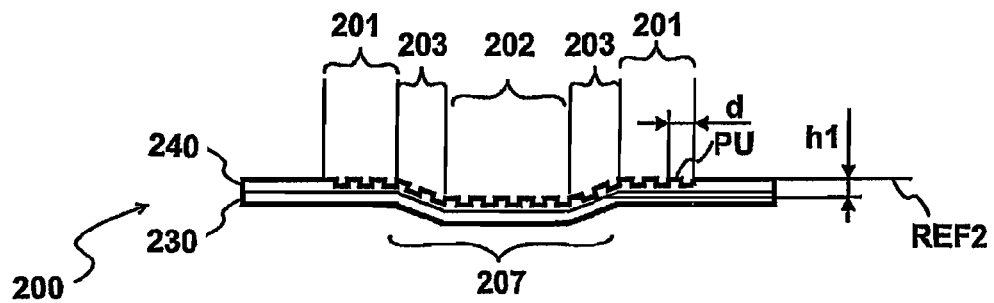

With reference to FIG. 2a, the embossing member 10 comprises a first stamping surface 11 and a bulge 16 with a second stamping surface 12. A doubly curved portion 13 is located between the first stamping surface 11 and the second stamping surface 12.

The concept of doubly curved will be defined later in the context of FIG. 9. Doubly curved means a surface curved in two orthogonal directions. For example, spherical and ellipsoid surfaces are doubly curved, but cylindrical and planar surfaces are not doubly curved.

At least the stamping surfaces 11, 12 have a diffractive microstructure. The diffractive microstructure comprises several microscopic protrusions PU (FIG. 2b) and/or microscopic concavities UR which are located next to each other at a spacing of a grating constant d. The grating constant d may be equal or unequal at different locations of the stamping surfaces 11, 12.

In the embodiment of FIG. 2a, the doubly curved portion 13 also has a diffractive microstructure. Consequently, the diffractive microstructure may extend in a substantially continuous manner over the whole surface of the embossing member 10. The first stamping surface 11, the second stamping surface 12 and the doubly curved portion 13 may thus be different portions of the same uniform microstructure area.

In another embodiment, the doubly curved portion 13 does not have a diffractive microstructure.

The bulge 16 protrudes from the plane REF1 of the first stamping surface 11. The height h3 of the bulge is greater than or equal to 0.05 mm. The height h3 of the bulge is advantageously from 0.2 to 1 mm.

Consequently, the embossing member 10 comprises at least two stamping surfaces 11, 12, wherein the second stamping surface 12 is substantially at a different height level with respect to the first stamping surface 11. In another embodiment, three or more stamping surfaces may be provided, and they may be located at different height levels.

FIG. 2b shows a product 200 made by using the embossing member 10 of FIG. 2a. The bulge 16 of the embossing member 10 forms a recess 207, i.e. a concave portion, in the product. The first stamping surface 11 of the embossing member embosses a first microstructure area 201 in the product 200. The second stamping surface 12 embosses a second microstructure area 202 in the recess 207. The doubly curved portion 13 of the embossing member 10 forms a doubly curved portion 203 between the first 201 and the second 202 microstructure areas in the product 200. The recess 207 is by an extent h1 lower than the plane REF2 of the first microstructure area 201.

The depth/height h1 of the recess/bulge is greater than or equal to 0.05 mm. The height difference h1 is advantageously between 0.2 and 1 mm. The height difference h1 may also be, for example, greater than or equal to the total thickness of the substrate 230 and its surface layer 240 multiplied by a factor which is between 0.1 and 2.

The diffractive microstructure may also extend substantially continuously between the microstructure areas 201, 202. The doubly curved portion 203 may also have a microstructure. Consequently, the first microstructure area 201, the second microstructure area 202, and the doubly curved portion 203 may also be portions of the same diffractive microstructure, said portions being at different heights.

In another embodiment, the doubly curved portion 203 does not have a diffractive microstructure.

The substrate 230 is partly compressed during the embossing. Similarly, the material of its surface layer 240 may be compressed or may flow during the embossing. The substrate 230 and its surface layer 240 are also shifted and stretched in the lateral direction during the formation of the recess. In particular, the formation of the doubly curved portion 203 requires considerable stretching and/or contraction of the substrate 230 and its surface layer 240.

Figure 3A:
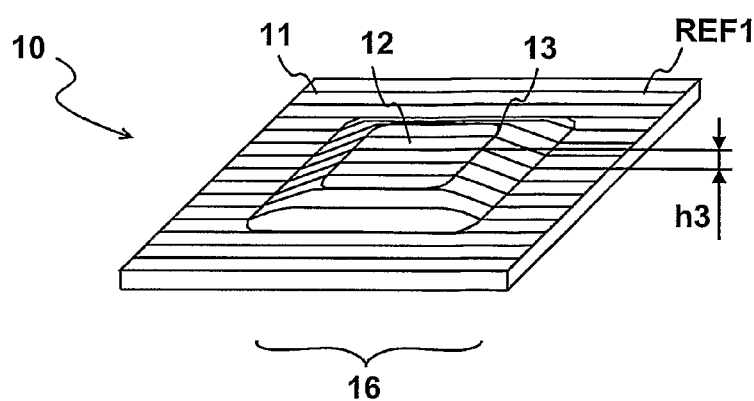
FIG. 3a is a schematic and three-dimensional view of an embossing member having a bulge.

With reference to FIG. 3a, the embossing member 10 may have a bulge 16 which has a height h3 with respect to the first stamping surface 11. The bulge 16 has the second stamping surface 12. Doubly curved portions 13 are located at the corners of the bulge 16, said portions 13 being at the same time also between the first 11 and the second 13 stamping surfaces.

Figure 3B:
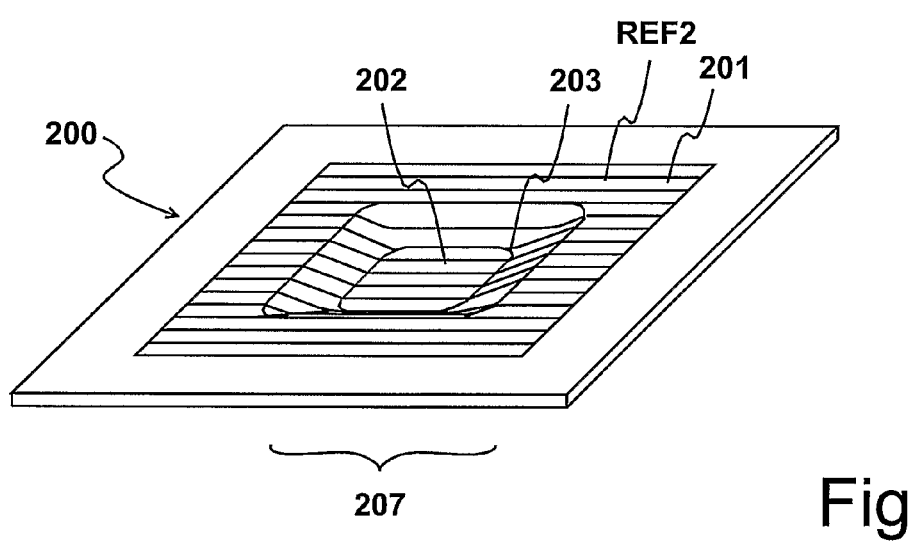

FIG. 3b shows a product 200 made by the embossing member 10 of FIG. 3a. The product 200 has a first microstructure area 201. The product 200 has a recess 207 corresponding to the shape of the bulge 16 of the embossing member 10, that is, a concave section, which has a second microstructure area 202. Doubly curved portions 203 are located at the corners of the recess 207, said portions 203 being at the same time also between the first 201 and the second 202 microstructure areas.

Figure 4A:
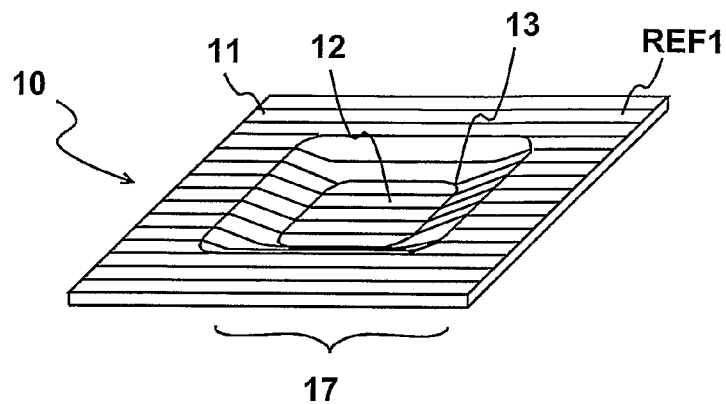
FIG. 4a is a schematic and three-dimensional view of an embossing member having a recess.

With reference to FIG. 4a, the embossing member 10 may have a recess 17. The recess 17 has the second stamping surface 12. Doubly curved portions 13 are located at the corners of the recess 17, said portions 13 being at the same time also between the first 11 and the second 13 stamping surfaces.

Figure 4B:
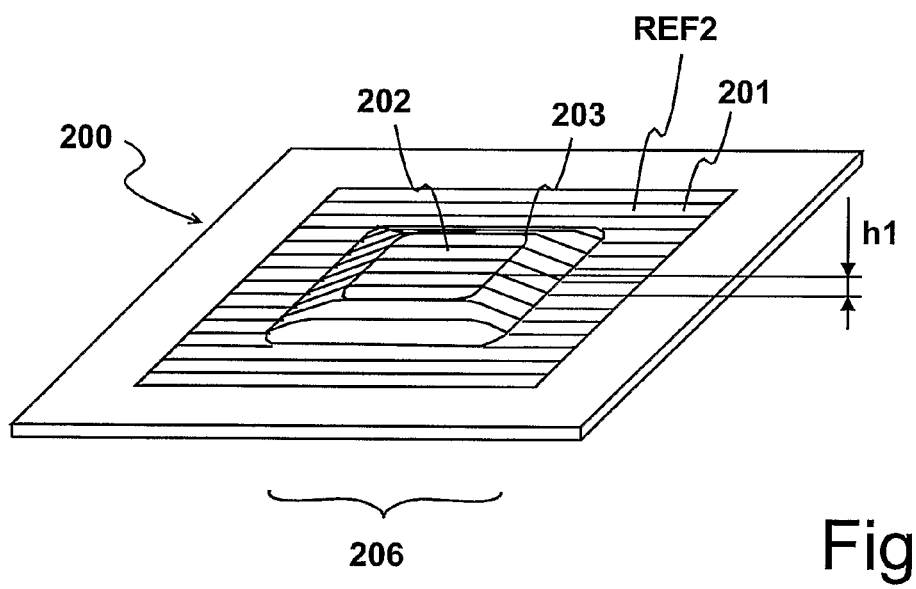

FIG. 4b shows a product 200 made by the embossing member 10 of FIG. 4a. The product 200 has a first microstructure area 201. The product 200 has a bulge 206 corresponding to the shape of the recess 17 of the embossing member 10, that is, a convex section comprising a second microstructure area 202. Doubly curved portions 203 are located at the corners of the bulge 206, said portions 203 being at the same time also between the first 201 and the second 202 microstructure areas.

Figure 5A:
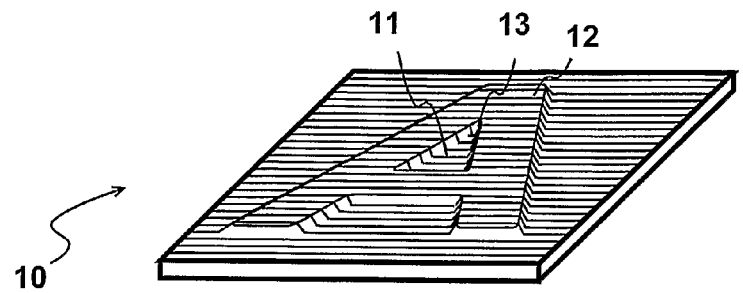
FIG. 5a is a schematic and three-dimensional view of an embossing member having a bulge, said bulge having the shape of the letter A.

With reference to FIG. 5a, the bulge and/or recess of the embossing member may have the shape of, for example, a letter, a symbol, or a trademark. In the case of FIG. 5a, the bulge has the shape of the letter "A".

Figure 5B:
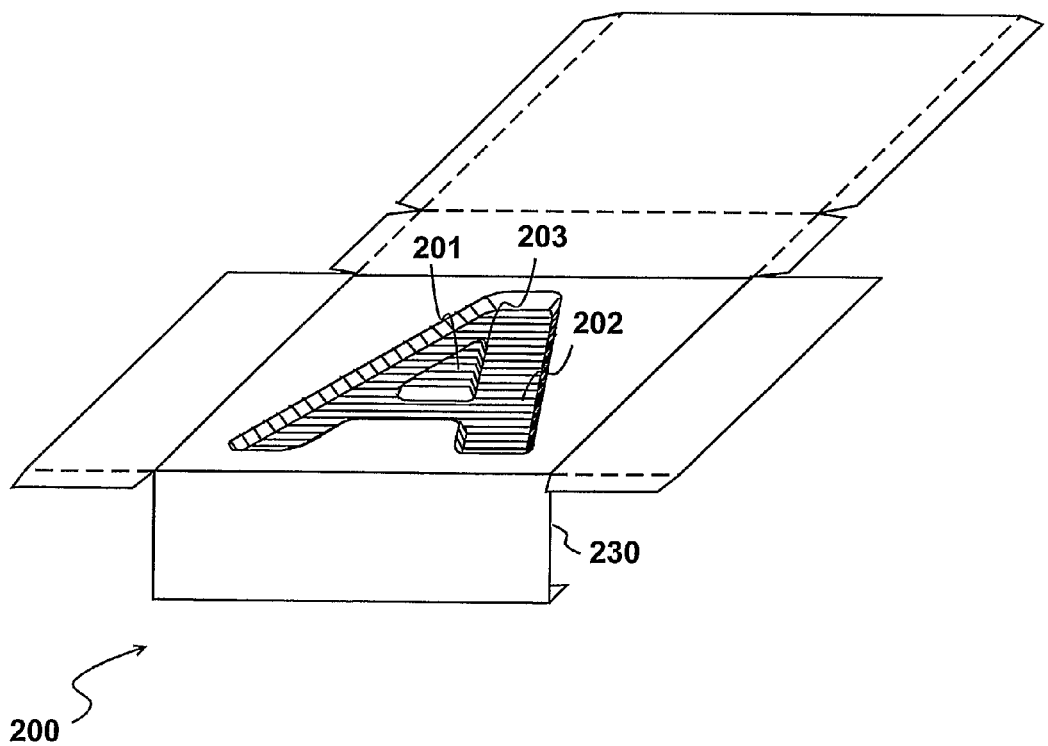

With reference to FIG. 5b, the product 200 may be a blank for a product package. The substrate 230 may be a sheet of cardboard, into which the diffractive patterns, bulges 206 and/or recesses 207 desired for the surface of product packages are embossed. The bulges, recesses and diffractive microstructure areas may represent, for example, a trademark and/or a symbol indicating the authenticity of the product. In the case of FIG. 5b, a recess with the shape of the letter "A" is produced on the surface of a product package. The substrate 230 may be later cut and bent to actual product packages.

The combination of the effect produced by the diffractive microstructures 201, 202 to the macroscopic three-dimensional shape of the surface layer 240 creates a special impression.

It is also possible to print patterns and/or text by conventional printing techniques onto the surface of the substrate 230 before the embossing of the microstructure areas 201, 202.

Figure 6:
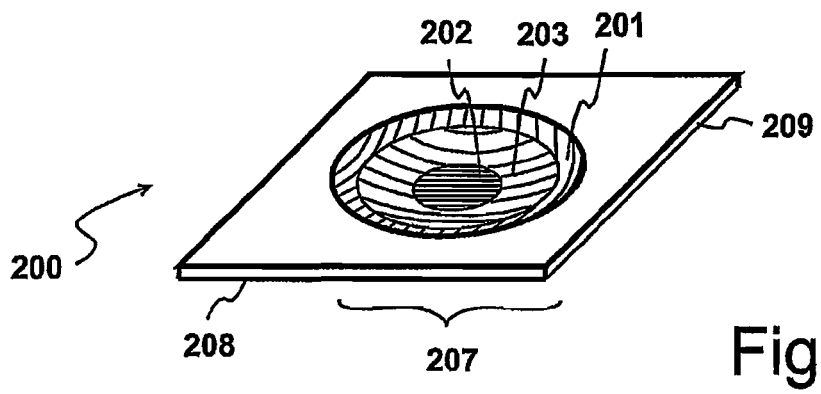
FIG. 6 is a schematic and three-dimensional view of a product having a recess.

FIG. 6 shows a recess 207 in the product 200, having the shape of a portion of a spherical surface. The recess 207 has a second microstructure area 202. In the case of FIG. 6, said recess 207 also comprises a first microstructure area 201. In the case of FIG. 6, the first microstructure area 201 and the second microstructure area 202 are doubly curved. The doubly curved portion 203 between the first 201 and second 202 microstructure areas may have a diffractive microstructure.

In another embodiment, the doubly curved portion 203 does not have a diffractive microstructure.

The microscopic protrusions of the first microstructure area 201 may extend, for example, in the direction of the side 208 of the product 200, and the microscopic protrusions of the second microstructure area 202 may extend in the direction of the side 209.

Figure 7:
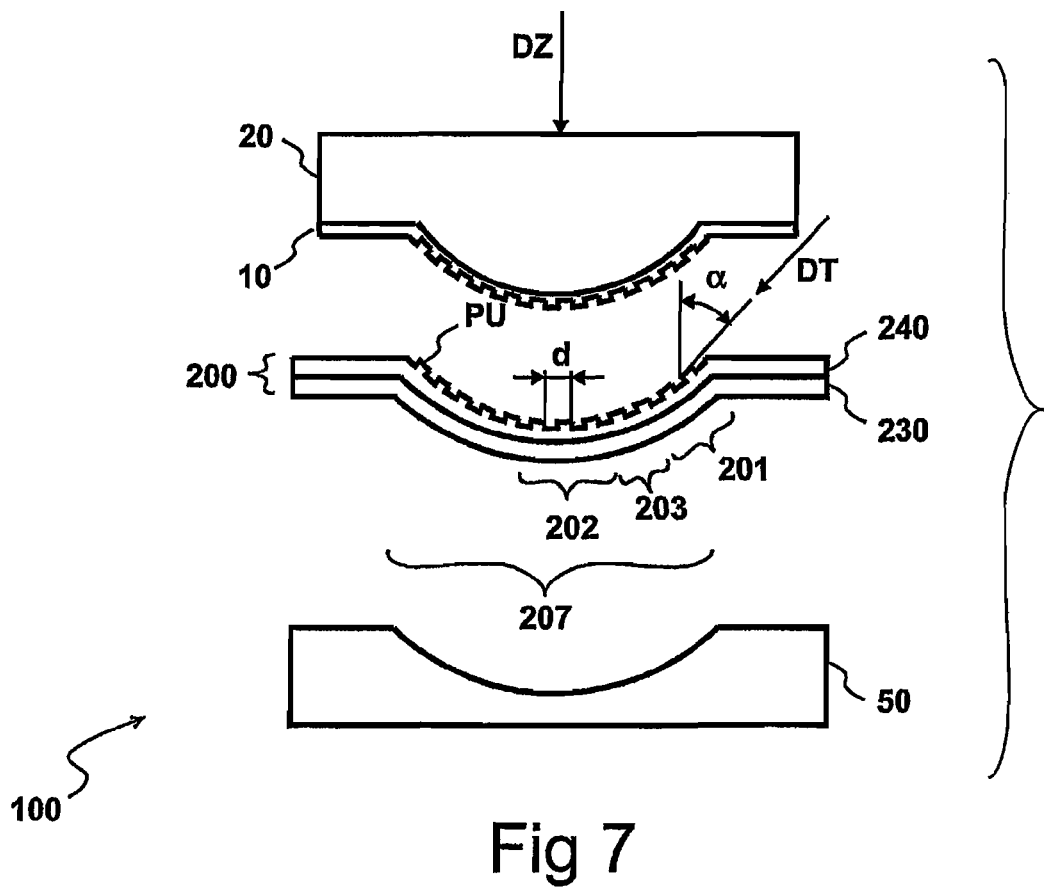
FIG. 7 is a schematic and cross-sectional view of producing the recess shown in FIG. 6.

FIG. 7 shows a method of manufacturing the product 200 of FIG. 6. The recess 207 and the microstructure areas 201, 202 are produced by one working movement of the embossing member 10 substantially in the direction DZ, wherein the direction DZ is defined with respect to the product 200.

One of the microstructure areas to be produced, for example the first microstructure area 201, may be substantially at an angle α, with respect to the direction of movement DZ during the embossing, said angle α deviating from a right angle. Consequently, the angle α may be substantially different from 90 degrees. For example, the angle α may be in the range of 60 to 80 degrees, or even in the range of 45 to 60 degrees.

Thus, tangential shifting in the direction DT takes place between the embossing member 10 and the surface layer 240 of the substrate during the initial stage of the embossing. Said tangential shifting in the direction DT is considerably greater than the grating constant d of the microstructure. However, it has been surprisingly found that a microstructure with a relatively good quality may be produced on paper or cardboard substrates even when the angle α is 45 degrees. Consequently, the tangential shifting does not fully damage the microstructure being produced, when paper or cardboard substrates are used.

However, the best quality for the microstructure is achieved in areas which are substantially perpendicular to the direction of movement DZ of the embossing member.

Figure 8:
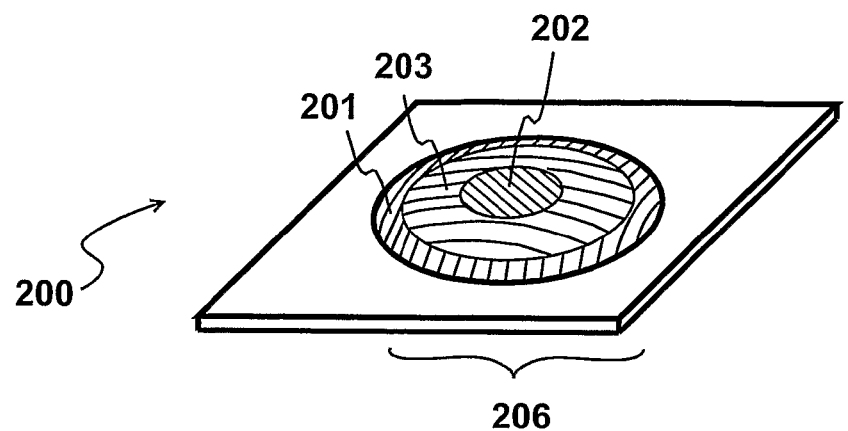
FIG. 8 is a schematic and three-dimensional view of a product having a bulge.

FIG. 8 shows a bulge 206 in the product 200, having the shape of a portion of a spherical surface. The bulge 206 has a second microstructure area 202. In the case of FIG. 8, said bulge 206 also comprises a first microstructure area 201. In the case of FIG. 8, the first microstructure area 201 and the second microstructure area 202 are doubly curved. The doubly curved portion 203 between the first 201 and second 202 microstructure areas may have a diffractive microstructure. In another embodiment, the doubly curved portion 203 does not have a diffractive microstructure.

Figure 9:
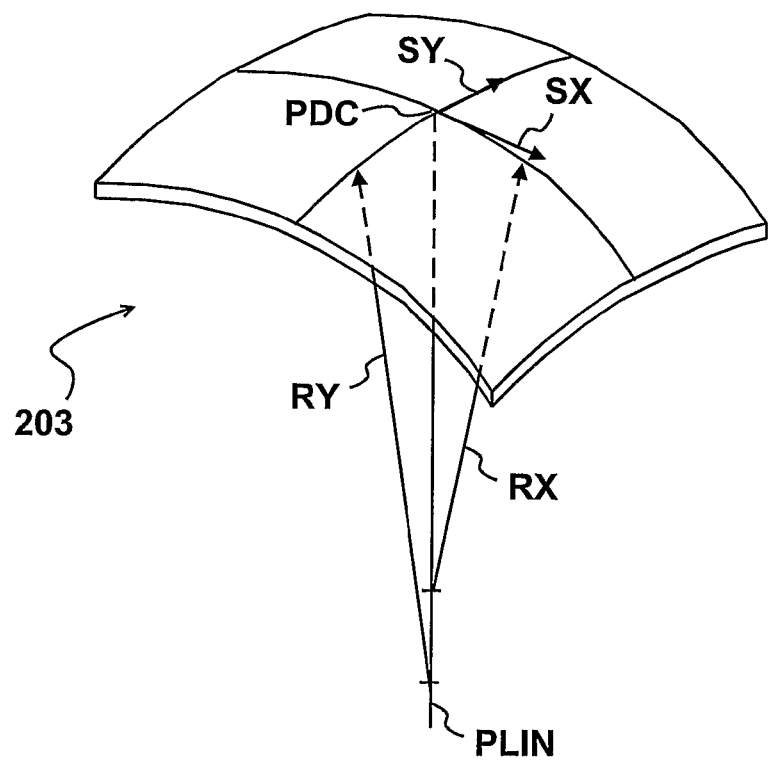
FIG. 9 is a schematic and cross-sectional view of a part of a doubly curved portion.

In the cases of FIGS. 8 and 9, the depth/height of the recess 207 or of the bulge 206 may also be defined by using the unembossed surface of the product 200 as a reference level. The depth/height of the recess 207 or bulge 206 is advantageously greater than or equal to 0.05 mm.

We shall now define the concept "doubly curved" with reference to FIG. 9. FIG. 9 shows a part of a doubly curved portion 203. A point PDC is an arbitrary point at the doubly curved portion 203. The directions SX and SY are orthogonal. The directions SX and SY are in a plane tangential to the surface at the point PDC. The surface is defined to be doubly curved in the infinitesimal environment of the point PDC if the radius of curvature of the surface has a finite value in all directions in the plane tangential to the surface at the point PDC. For example, spherical and ellipsoid surfaces are doubly curved. For comparison, it is noted that cylindrical and planar surfaces are not doubly curved, because their radius of curvature is infinite in at least one direction. The radius of curvature of the surface is equal to RX when travelling an infinitesimal distance from the point PDC in the direction SX. The radius of curvature of the surface is equal to RY when travelling an infinitesimal distance from the point PDC in the direction SY. The origins of the radii RX, RY of curvature of the surface are on a straight line PLIN passing via the point PDC and being perpendicular to said surface. According to the invention, the radius of curvature RX in a first arbitrary direction SX is smaller than or equal to 50 mm, and the radius of curvature RY in a second orthogonal direction SY is smaller than or equal to 50 mm, wherein the directions SX and SY are selected so that said radius of curvature RY reaches its maximum value in said second direction SY.

Referring back to FIGS. 1 and 7, the pressing force needed for the embossing may be developed, for example, hydraulically, pneumatically, or by using a combination of a wobbler and a connecting rod.

The backing member 50 advantageously has recesses and/or bulges corresponding to the bulges 16 and/or recesses 17 of the embossing member.

Referring back to FIGS. 1, 2a, 3a, 4a, 5a, and 7, the embossing member 10 may be made, for example, of a nickel sheet whose thickness is from 0.02 to 0.5 mm. The microstructure is produced on the surface of the sheet, for example, by optical and electrochemical methods, or by using ion beam etching. The bulges 16 and/or recesses 17 may be implemented by using methods known in the area of sheet metal shaping. In the manufacture of the embossing member 10, stretching and thinning of the material typically takes place in the doubly curved portions 203. However, the sheet with the diffractive microstructure must be worked in such a way that the diffractive microstructure of the stamping surfaces 11, 12 is damaged as little as possible.

Referring back to FIGS. 1, 2b, 3b, 4b, 5b, 6, 7, and 8, the substrate 230 is paper or cardboard. The surface layer 240 may consist, for example, of acrylate lacquer or thermoplastic polymer, for example polyvinyl chloride or polycarbonate. The substrate 230 and its surface layer 240 may consist of the same material. The surface layer 240 of the embossable substrate may also consist of ink or dye.

Consequently, the diffractive microstructure consists of several periodically arranged microscopic protrusions PU or recesses UR that recur at least in one direction at a spacing of the grating constant d. The value of the grating constant d and the orientation of said protrusions may be the same or may vary at different locations on the surface, wherein the desired holographic effect or pattern is obtained. The side profile of the microscopic protrusions may be, for example, sinusoidal, triangular, or rectangular.

The grating constant d is advantageously between 0.4 µm and 3 µm at least one location, wherein the microstructure creates a strong visual effect at said location. The grating constant d may vary at different locations of the microstructure, wherein different values of the grating constants d are advantageously between 0.4 µm and 3 µm substantially over the whole area of the microstructure.

The height of the protrusions may range, for example, from 50 to 200 nm. The height of the protrusions is advantageously of the same order of magnitude as the quarter of the wavelength of green light, that is, about 120 nm. The height of said microscopic protrusions is several orders of magnitude smaller than the height difference between the microstructure areas 201, 202.

The stamping surfaces 11, 12 of the embossing member 10 comprise microscopic concavities UR which produce said protrusions PU. The concavities UR are advantageously elongated grooves, and the protrusions PU are advantageously elongated ridges. The concavities UR are placed at locations corresponding to the protrusions PU to be produced. The depth of the concavities UR is equal to or greater than the height of the protrusions PU to be produced.

When looking at the visual effect produced by the microstructure, the microstructure area is advantageously illuminated with white light, that is, light that comprises wavelengths between 400 and 760 nm. In special cases e.g. monochromatic laser light may be used.

The intensity of the light diffracted from the diffractive microstructure has a maximum at least one illumination angle and at least one diffraction angle which fulfill the grating equation:

$$m\lambda/d = \sin\theta_d + \sin\theta_i, \quad (1)$$

in which m is a positive or negative integer indicating the diffraction order, $\lambda$ is the wavelength of light, d is the grating constant, the illumination angle $\theta_i$ is the angle between the direction of incidence of light and the normal of the surface of the microstructure, defined clockwise from said normal of the surface, and the diffraction angle $\theta_d$ is the angle between the diffraction direction and the normal of the surface, defined clockwise from said normal of the surface. The effect produced by the microstructure can be viewed from a direction defining an angle of viewing. Consequently, the visual effect produced by the diffractive microstructure depends, for example, on the illumination angle and on the angle of viewing, on the grating constant d, on the orientation of the microstructure, as well as on the lighting conditions.

The diffractive effect refers to the effect whose dependence from the diffraction angle can be described and/or approximated at least partially by using the grating equation (1) when the diffraction order m is a positive or negative integer. The light to be diffracted can fulfill the grating equation (1) also in the diffraction order m=0, but in this case the grating equation (1) represents specular reflection. It is noted that specular reflection in the diffraction order m=0 does not require the use of a diffractive microstructure.

The microstructure areas 201, 202 may be adapted to produce similar or different visual effects. For example, the first microstructure area 201 may be adapted to produce a blue color effect under certain lighting conditions, whereas the second microstructure area 202 in a bulge/recess may provide a red effect under said lighting conditions. This kind of a combination creates a special impression, and its copying for counterfeiting purposes is difficult.

The periodic protrusions PU in the microstructure areas 201, 202 may also have different orientations. The protrusions PU in the first microstructure area 201 may be parallel to the side 208 of the product (FIG. 6), and the protrusions PU in the second microstructure areas 202 may be parallel to the side 209. The product may be illuminated with white directed light. Thus, the microstructure areas 201, 202 may diffract light of a given color to the eye of the viewer at different times when the viewer is moving with respect to the product 200, for example when the viewer is passing the product exhibited for sale or when the viewer is turning the product in his/her hands.

The microstructure areas 201, 202 may also have the same grating period d as well as the same orientation. Thus, the embossing member 10 may be produced of a sheet having a uniform grid structure throughout. In this case, however, the copying of the product 200 for counterfeiting purposes is easier than in a situation in which the different microstructure areas have different grating periods d and/or orientations.

Referring back to FIG. 5b, the product 200 may also be, for example, a product package or a product brochure. The microstructure areas 201, 202 according to the invention may be embossed directly, for example, on a product brochure, on a product package or directly on the surface of the product for authentication and also for arousing the consumer's interest. The microstructure areas 201, 202 to be produced may be, for example, letters, as in FIG. 5b, numbers, or geometrical patterns.

Several zones 201, 201 having identical or different microstructures may be produced into the surface layer 240 of the substrate 230, in order to create a desired diffractive effect, holographic effect, movement effect, pattern depending on the direction of viewing, animation, or three-dimensional impression. The substrate 200 may also comprise patterns or symbols produced with a dye. These may be produced before the embossing, simultaneously with it, or afterwards. The patterns implemented with a dye and the produced microstructures may be partly overlapping.

The diffractive microstructure areas 201, 202 produced by embossing are left bare, wherein the microstructure of the areas is visible from at least one direction so that there is no transparent protective layer between the microstructure and the viewer.

A relatively strong diffractive effect may be implemented by embossing only non-metallic materials so that the microstructure areas 201, 202 do not need to be coated with a metal film in order to strengthen the effect. The microstructure areas 201, 202 advantageously comprise only non-metallic material, wherein the product is easier to recycle and less expensive to manufacture than a product in which the microstructure area is implemented on a metallic surface.

The surface layer 240 may also comprise bulges which do not have diffractive microstructure, in order to protect the microstructure areas 201, 202 from wear.

Also, one or more microstructures may be visually almost unnoticeable so that only persons aware of their existence may check the information relating to the microstructure areas. This kind of an application is disclosed, for example, in US patent publication 2003/0173046. The microstructure areas may even be left inside of a folded package.

Figure 10:
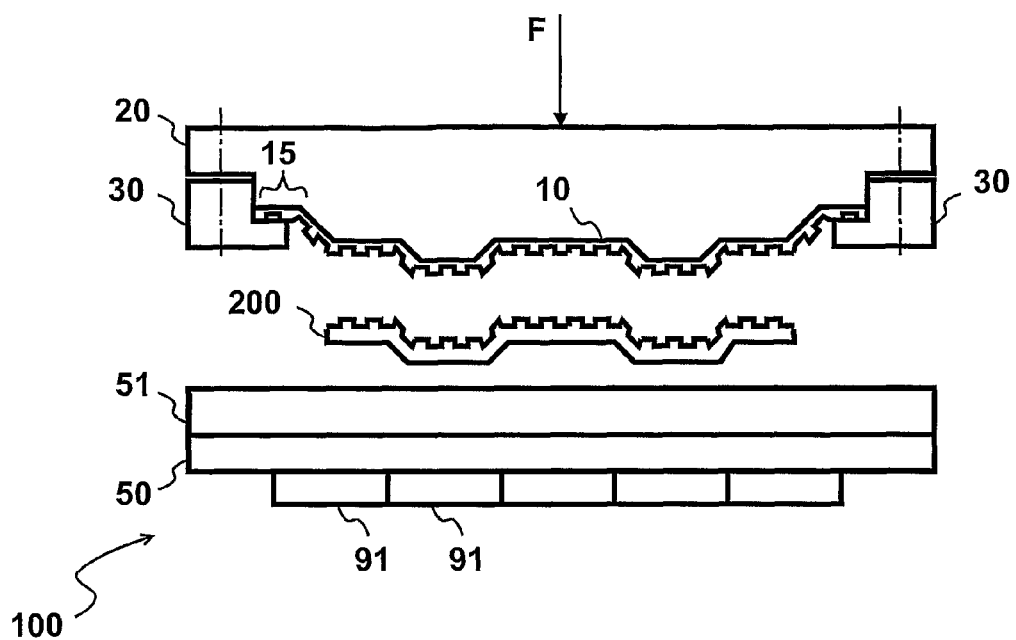
FIG. 10 is a schematic and cross-sectional view of an embossing device having a flexible or a yielding backing member.

With reference to FIG. 10, the backing member 50 of the embossing device 100 may also comprise a flexible or a yielding surface layer 51. The surface layer 51 of the backing member 50 may consist, for example, of rubber.

It should be noted that if the substrate 230 and/or its surface layer 240 are sufficiently thick, as well as sufficiently compressible, or of a material that flows plastically under pressure, the backing member 50 may also be flat and unyielding.

As shown in FIG. 10, the embossing member 10 may comprise one or more fastening portions 15 for fastening the member 10 to the embossing device 100. The fastening portion 15 may be fastened to the backing support 20, for example, by compressing a fixing flange 15 between a frame 30 and the backing support 20. The frame 30 may be fastened to the backing support, for example, by screws. Alternatively, the embossing member 10 may also be fastened by using, for example, adhesive, adhesive labels, or solder.

The surface layer 240 of the substrate, the embossing member and/or the backing member are advantageously heated by heaters 91 to plasticize the surface layer. The heating may also facilitate the macroscopic shaping of the substrate 230 and its surface layer 240.

Figure 11:
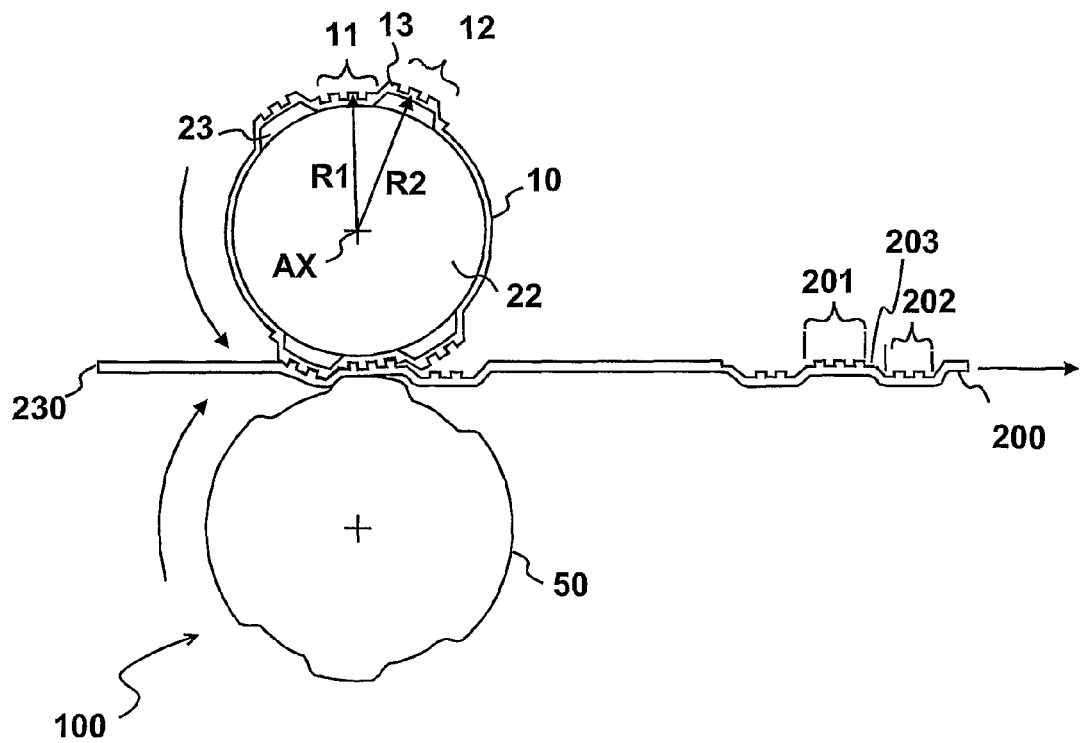
FIG. 11 is a schematic and cross-sectional view of an embossing device having a cylindrical embossing member arranged to be rotatable.

With reference to FIG. 11, the embossing member 10 and the backing member 50 may also be cylindrical and arranged to be rotatable. The embossing member 10 comprises stamping surfaces 11, 12 at least two different distances R1, R2 from a rotation axis AX; that is, they may have different radii. The difference between the radii R2 and R1 is selected to correspond to the shape of the bulge and/or recess to be produced. The difference between the radii R2 and R1 may be, for example, from 0.05 mm to 1 mm.

The substrate 230 and its surface layer 240 are compressed between the embossing member 10 and the backing member when these are rotated, wherein diffractive microstructure areas 201, 202 are embossed on the surface layer 240, said areas 201, 202 being at least two different height levels.

The cylindrical embossing member 10 may be made, for example, by bending a sheet comprising diffractive microstructure areas 11, 12 and macroscopic bulges into a cylinder and by welding it, for example, by laser welding. Advantageously, filling blocks 23 are provided under the bulges of the embossing member 10. Advantageously, the backing member 50 has recesses corresponding to the shape of the embossing member 10.

Advantageously, the microstructure areas 201, 202, the bulges 206, and the recesses 207 are produced by a single working movement of the same embossing member 10. However, the second microstructure area 202 may also be produced by a different embossing member 10 different than what is used for the first microstructure area 201.

Nevertheless, the first 101 and the second 202 microstructure areas may also be produced by using the stamping surface of the same embossing member 10. After producing the first microstructure area 201, the embossing member 10 may be shifted in the lateral direction with respect to the substrate 230, and after this, the same stamping surface may be used for embossing the second microstructure area 202 as well.

The invention claimed is:

1. A product comprising:
a paper or cardboard substrate having a surface layer;
a first embossed diffractive microstructure area on the surface layer of the paper or cardboard substrate formed by exerting an embossing pressure on said surface layer by an embossing member and a backing member;
wherein the first embossed diffractive microstructure area is bare and its grating constant is between 0.4 µm and 3 µm in at least one location;
wherein the first embossed diffractive microstructure area is formed of protrusions having a height of 50 to 200 nm;
a second embossed diffractive microstructure area on the surface layer of the paper or cardboard substrate, the second embossed diffractive microstructure area formed on portions of the paper or cardboard substrate surface layer forming a bulge or a recess;
wherein the second embossed diffractive microstructure area is formed of protrusions having a height of 50 to 200 nm;
wherein the first embossed diffractive microstructure area is separated by height from the second embossed diffractive microstructure area by 0.2 to 1.0 mm; and
wherein a doubly curved portion of paper or cardboard substrate surface layer is located between the first embossed diffractive microstructure area and the second embossed diffractive microstructure area.

2. The product of claim 1 wherein the doubly curved portion of paper or cardboard substrate surface layer comprises a diffractive microstructure.

3. The product of claim 1 wherein the first embossed diffractive microstructure area or the second embossed diffractive microstructure area is doubly curved.

4. The product of claim 1 wherein the paper or cardboard substrate forms part of a product package or a product brochure.

5. The product of claim 1 wherein the first embossed diffractive microstructure area and the second embossed diffractive microstructure area have different grating constants.

6. The product of claim 1, wherein the first embossed diffractive microstructure area has microstructures arranged on a first grid structure having a first orientation, and the second embossed diffractive microstructure area has microstructure arranged on a second grid structure having an orientation which is different from the first orientation.

7. A method for manufacturing a product having a plurality of diffractive microstructure areas, comprising the steps of:
embossing a first diffractive microstructure area on a surface layer of a substrate of paper or cardboard by exerting an embossing pressure on said surface layer with an embossing member and an opposed backing member;
wherein the first diffractive microstructure area is formed of protrusions having a height of 50 to 200 nm and is embossed with a grating constant of between 0.4 µm and 3 µm, in at least one location and wherein said first diffractive microstructure area is left bare;
forming a bulge or a recess in the substrate of paper or cardboard, the bulge or recess having portions defining a second diffractive microstructure area formed of protrusions having a height of 50 to 200 nm;
wherein the first embossed diffractive microstructure area is separated in height from the second embossed diffractive microstructure area by 0.2 to 1.0 mm; and
forming a doubly curved portion between said first diffractive microstructure area and said second diffractive microstructure area.

8. The method of claim 7, wherein during the embossing step, the embossing member undergoes a working movement, and wherein a direction of the working movement of said embossing member substantially deviates from a perpendicular direction, said perpendicular direction being perpendicular with respect to said first diffractive microstructure area.

9. The method of claim 7 wherein the embossing member is cylindrical and arranged to rotate about an axis of rotation and has at least a first stamping surface and a second stamping surface positioned at different distances from the axis of rotation, and wherein the step of embossing the first diffractive microstructure comprises rotating the embossing member to engage the first stamping surface with the paper or board substrate, and the step of forming the bulge or recess having portions defining the second diffractive microstructure comprises rotating the embossing member to engage the second stamping surface with the paper or board substrate.

10. The method of claim 7, wherein the method comprises:
embossing a microstructure area at substantially one height level on the surface layer of the substrate, and working said microstructure area, which is at said one height level, to form the bulge or a recess and the at least one doubly curved portion.

11. The method of claim 7 wherein the embossing member is formed by working a metal sheet having a microstructure thereon.

12. The method of claim 7 wherein the first diffractive microstructure area and second diffractive microstructure area are embossed directly on the surface layer which forms part of a product package or a product brochure.

13. A device for producing diffractive microstructure areas on a surface layer of a paper or cardboard substrate by embossing, comprising:
   an embossing member;
   an opposed backing member for exerting an embossing pressure on said surface layer;
   wherein said embossing member has a stamping surface having a first diffractive microstructure whose grating constant is between 0.4 µm and 3 µm in at least one location; and
   wherein the first diffractive microstructure is formed of protrusions having a height of 50 to 200 nm;
   wherein the embossing member further comprises a bulge or a recess, which bulge or recess comprises a second stamping surface having a second diffractive microstructure,
   wherein the second embossed diffractive microstructure area is formed of protrusions having a height of 50 to 200 nm;
   wherein the first embossed diffractive microstructure is separated in height from the second embossed diffractive microstructure by 0.2 to 1.0 mm; and
   wherein a doubly curved portion is located between said first stamping surface and said second stamping surface.

14. The device of claim 13 wherein the embossing member is arranged to move along a working direction toward the opposed backing member during the embossing, such that the working direction movement of said embossing member is arranged to substantially deviate from a perpendicular direction, said perpendicular direction being perpendicular with respect to said stamping surface.

* * * * *

UNITED STATES PATENT AND TRADEMARK OFFICE
CERTIFICATE OF CORRECTION

Figure 12A:
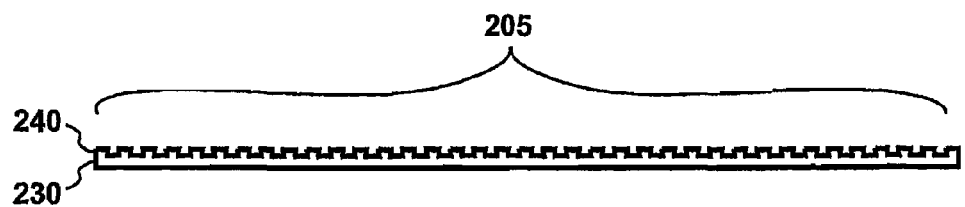
FIG. 12a is a schematic and cross-sectional view of a substrate having a microstructure in substantially one plane.
Figure 12B:
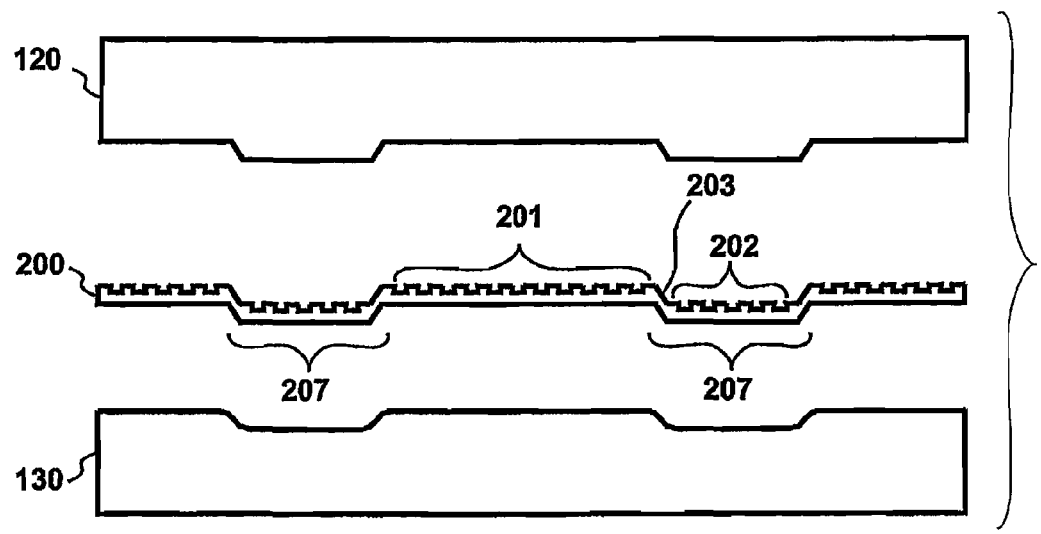

PATENT NO. : 8,105,677 B2
APPLICATION NO. : 12/303475
DATED : January 31, 2012
INVENTOR(S) : Pekka Koivukunnas and Harri Kosonen It is certified that error appears in the above-identified patent and that said Letters Patent is hereby corrected as shown below:

Column 9, line 47, following "embossing the second microstructure are 202 as well."
Add -- With reference to FIGS. 12a and 12b, the microstructure areas 201, 202 may also be produced in two different steps. FIG. 12a shows a substrate 230, whose surface layer 240 has a microstructure 205 in substantially one plane. Said microstructure 205 in substantially one plane may be worked later by providing it with bulges 206 and/or recesses 207, with microstructure areas 201, 201 at different levels, as well as with doubly curved portions therebetween.

Consequently, the diffractive microstructures of the first 201 and second 202 microstructure areas may be embossed simultaneously by using a stamping surface, which surface is substantially in one plane. After this, the height difference between the first 201 and second 202 microstructure areas may be implemented by shaping the substrate 230 and/or its surface layer 240 using shaping means, for example by using male and female press moulds 120, 130 which do not need to comprise a diffractive stamping surface. The mutual clearance of the moulds 120, 130 and the quality of the surface are selected so that the diffractive surface of the microstructure areas 201, 202 is damaged as little as possible.

The invention is not limited solely to the embodiments presented in the above description or in the drawings. The aim is to limit the invention only by the presentation of the scope of the appended claims. --

Signed and Sealed this
Thirty-first Day of July, 2012

David J. Kappos
*Director of the United States Patent and Trademark Office*